United States Patent [19]
Grant

[11] 3,905,387
[45] Sept. 16, 1975

[54] NEEDLE TYPE INFLATION VALVE

[76] Inventor: Munro M. Grant, 3975 Rum Row, Naples, Fla. 33940

[22] Filed: Oct. 3, 1974

[21] Appl. No.: 511,597

[52] U.S. Cl. .............................................. 137/223
[51] Int. Cl.² ........................................ F16K 15/20
[58] Field of Search ..... 137/223; 46/9 D; 273/65 D; 128/349 BV; 220/DIG. 19; 5/348–350, 348 WD

[56] References Cited
UNITED STATES PATENTS

| | | | |
|---|---|---|---|
| 2,176,565 | 10/1939 | Boynton | 137/223 |
| 2,731,028 | 1/1956 | McCord | 137/223 |
| 3,401,714 | 9/1968 | Scott | 137/223 |

FOREIGN PATENTS OR APPLICATIONS

| | | | |
|---|---|---|---|
| 5,917 | 1905 | United Kingdom | 137/223 |
| 690,934 | 4/1953 | United Kingdom | 137/223 |

*Primary Examiner*—Harold W. Weakley

[57] ABSTRACT

There is disclosed herein a needle type inflation valve comprising a housing portion having a circumferential flange for securing the housing to a bladder and a frustoconical through opening which receives a valve core. The valve core is made of readily deformable material and has a relatively heavy flange on one end and a relatively thinner flange on the other. The end of the core having the thin flange is inserted into the housing at the larger end of the frustoconical through opening whereby the thin flange folds backwardly as the core is pushed through the opening and snaps outwardly beyond the smaller end of the opening.

6 Claims, 5 Drawing Figures

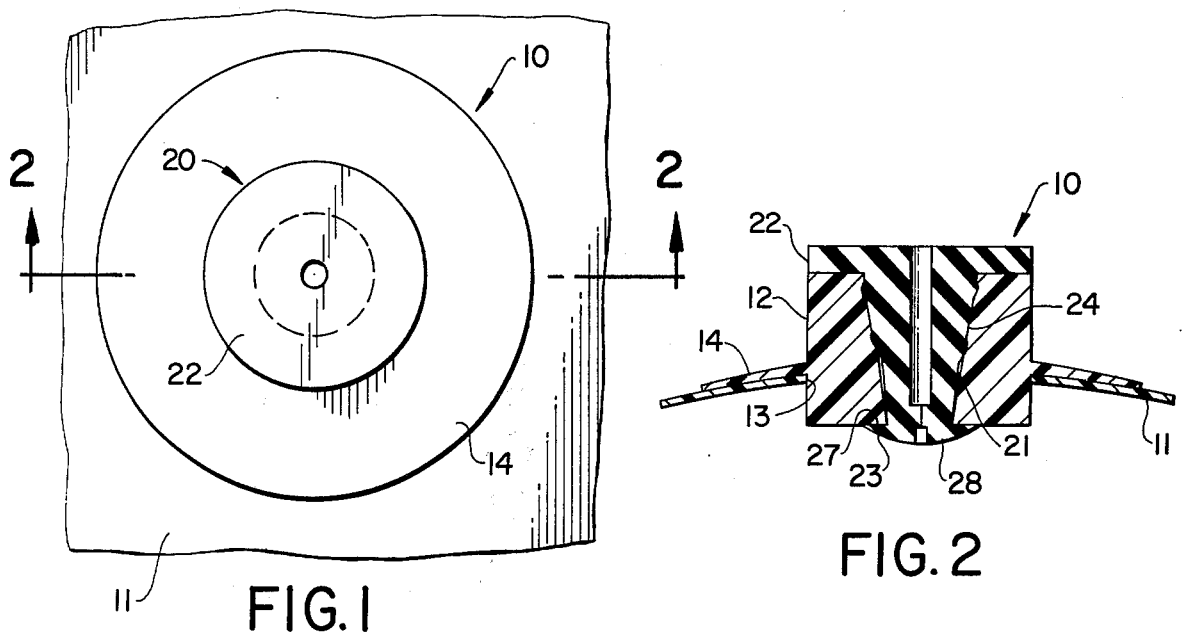
FIG. 1
FIG. 2
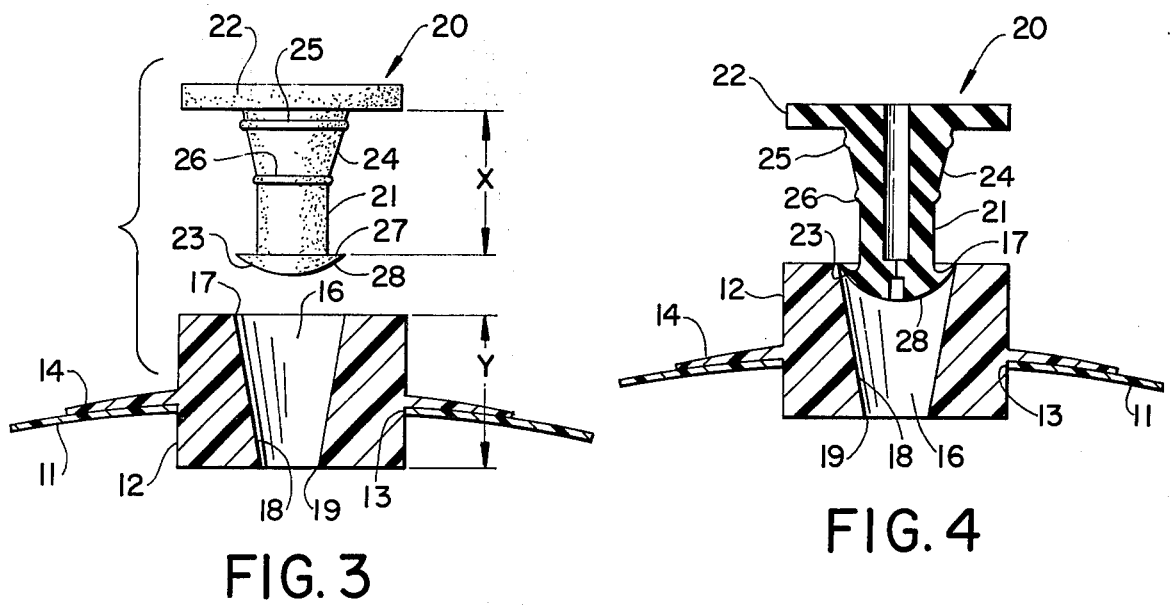
FIG. 3
FIG. 4
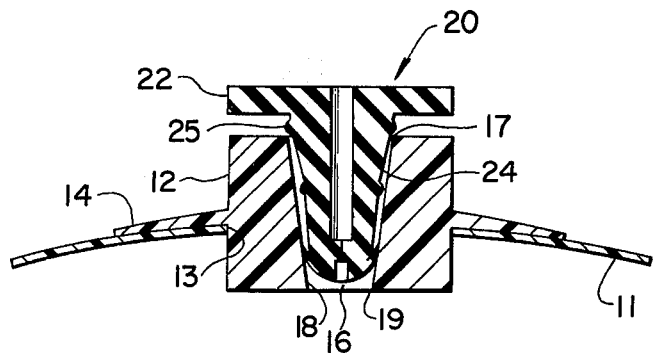
FIG. 5

NEEDLE TYPE INFLATION VALVE

This invention relates to an air valve adapted to be used in conjunction with an inflation needle for inflating an inflatable article.

Needle type inflation valves are particularly adapted for inflating playing articles such as basketballs, volleyballs and footballs due to their simplicity and inherent ruggedness. Similarly, this type of inflation valve is well suited for introducing air into or pumping up inflatable protective athletic gear which may be used to protect various parts of the player's body.

It is known to provide valves of this type in two parts, one comprising a housing secured over an opening in an inflatable bladder and the other comprising a core disposed within the housing. The housing normally has a fairly large through opening into the bladder or other inflatable member in which the resilient core is seated. The core is axially perforated by slitting the resilient material whereby the same will tightly close and retain air within the inflated article after the inflation needle has been withdrawn.

The general object of the present invention is to provide an improved needle type inflation valve of the general type set forth above.

Another object of the invention is to provide a two piece valve structure having a valve core which is more easily seated within the valve housing than valve cores of known structures.

Still another object of the invention is to provide an air valve as set forth above wherein the core may be seated within the housing by manual means only without the use of tools.

Still another object of the invention is to provide an air valve having the foregoing features and characteristics wherein the opening in the housing provides means guiding the resilient core toward the seated position when the core is manually inserted in the housing.

Other objects of the invention and a number of advantages thereof will be readily apparent from the following description of one embodiment of the invention as disclosed in the accompanying drawings, in which said drawings:

FIG. 1 is a plan view of the needle type air valve of this invention;

FIG. 2 is a transverse section taken along the line 2—2 of FIG. 1;

FIG. 3 is an exploded view showing the valve core just prior to being inserted into the through opening of the housing;

FIG. 4 is a sectional view showing the valve core just beginning to enter the through opening of the housing; and FIG. 5 is a view similar to FIG. 4 showing the valve core just prior to being completely seated within the housing, the completed seated position being shown in FIG. 2.

Referring now to the drawings in all of which like parts are designated by like reference numerals, in FIG. 1 the air valve of this invention is generally indicated by the numeral 10 and is shown in conjunction with a bladder portion 11 which represents any suitable inflatable article. As shown in FIG. 2, the completed valve 10 comprises a housing 12 a portion of which projects through an opening 13 in the bladder portion 11. The housing 12 has a circumferentially continuous, radially extending flange 14 which overlaps the bladder portion 11 around the opening 13 and is secured thereto in any suitable manner. The housing 12 is preferably made from a plastic such as a vinyl of slight resilience, and where a bladder portion 11 comprises a similar plastic material, the flange 14 is preferably heat sealed directly to said bladder portion.

As shown particularly in FIG. 3, the housing 12 has a central through opening 16 adapted to receive the valve core which is generally indicated at 20. The through opening 16 is frustoconical in shape whereby to provide a larger end opening at 17, a tapered converging circumferential wall 18, and a smaller end opening 19. The through opening 16 is preferably frustoconical throughout most or the entire axial dimension of the opening with the widest dimension of the taper being at or adjacent to the larger end opening 17.

The valve core 20 is made of a suitable readily deformable resilient material such as rubber and comprises a central stem 21 having a relatively large, heavy rearward flange 22 at one end thereof and a relatively smaller, thin forward flange 23 at the other end thereof. A substantial portion of the stem 21 adjacent to the rearward flange 22 is frustoconical in shape as indicated at 24, the taper of the portion 24 being in the same direction as the taper of the through opening 16 in the housing 12. The frustoconical portion 24 of the valve core 20 is preferably provided with a pair of integrally formed, annular sealing rings 25 and 26 adapted to be substantially flattened against the circumferential wall 18 of the housing 12. The forward flange 23 is substantially smaller in diameter than the flange 22 and is provided with a flat inner surface 27 and a convexly rounded outer end surface 28, whereby said flange 23 tapers radially outwardly to a thin, flexible edge portion.

The means of inserting the valve core 20 into the through opening 16 of the housing 12 is illustrated in steps in FIGS. 4 and 5. FIG. 4 shows valve core 20 at the beginning of its insertion into the through opening 16. The insertion is made with the smaller, thin forward flange 23 projected into the larger end opening 17 of the through opening. The diameter of the forward flange 23 may be somewhat greater than the diameter of the large end opening 17, but said forward flange readily bends or folds backwardly with respect to the insertion movement due to its pronounced flexibility.

As the valve core 20 is inserted further into the through opening 16, the tapered wall 18 progressively cams or folds the thin, flexible flange 23 back along the outer surface of the stem 21. The resilient valve core 20 is readily compressible and by normal, firm manual pressure can be pressed longitudinally whereby the flange 23 is forced sufficiently through the smaller end opening 19 to allow the flange 23 to snap outwardly into overlapping relationship with the adjacent end of the housing 12. If the valve core 20 is inserted in the housing 12 prior to being mounted to the bladder portion 11, then manual pressure can be applied firmly against the flange 22 with one hand while the other hand can be used to aid in working the thin flange 23 out of the smaller end opening 19 and into the fully seated position. Moistening or otherwise lubricating the conical wall 18 will further facilitate the manual assembly of the valve core 20 to the housing 12. It has been found that such manual assembly is possible even where the dimension between the flanges 22 and 23 is less than the axial dimension of the through opening 16, this being a preferred relationship insuring firm, airtight seating of the valve core.

From the foregoing it will be seen that the present invention provides a two-piece needle type inflation valve which can be readily and quickly assembled without the use of special tools and in which the valve core is nonetheless firmly and immovably seated within the housing during even the roughest treatment. The larger rearward flange 22 is preferably the flange exposed at the outside of the ball or other inflated article whereby the same can be easily grasped to manually forcibly remove the valve core 20 for rapid deflation of the article or replacement of the valve core.

It will be understood that many changes in the details of the invention as herein described and illustrated may be made without, however, departing from the spirit thereof or the scope of the appended claims.

Although the valve of the present invention has been described primarily in application where it admits, exhausts and prevents the passage of air, it is to be understood that it may also be employed in applications where it is in contact with and/or seals against the passage of liquids, gases or pressure fluids and that the term "inflatable" includes liquid, fluid or gas containable articles.

What is claimed is:

1. A needle type inflation valve structure comprising a housing portion adapted to be secured to an inflatable article, said housing portion affording a through opening into the article; a resilient valve core comprising a stem seated within said through opening, said stem being axially perforated to receive an inflation needle and having radially forward and rearward extending flanges at the ends, said flanges radially overlapping said housing portion; said through opening having one end thereof substantially larger than the other end and at least a substantial portion of the axial dimension of said through opening having converging wall portions extending inwardly of said opening from said larger end; said forward radiating flange on one end of said stem being substantially thin and foldable closely against the sides of said stem to allow said one end to be forcefully projected into said larger end of said through opening in one direction, said converging wall portions coacting with said forward flange and folding it back along said stem whereby the stem and forward flange can be projected outwardly of the other end of said through opening to seat said valve core in said through opening.

2. In an inflation valve as set forth in claim 1, at least a substantial portion of the axial dimension of said stem having wall portions converging in the same direction as and engaging said converging wall portions of said through opening.

3. In an inflation valve as set forth in claim 1, said stem having at least one integrally formed, radially projecting sealing ring compressed tightly against wall portions of said through opening.

4. In an inflation valve as set forth in claim 1, said one end of said stem and said forward flange having axially forwardly facing outer end surface portions which slope backwardly relative to said one direction of movement of said valve core whereby said thin flange tapers radially outwardly to a thin circumferential edge, said sloping end surface portions coacting with said converging wall portions of said through opening to fold said thin flange backwardly and facilitate the seating of said valve core in said through opening.

5. In an inflation valve as set forth in claim 1, said housing being made of a vinyl plastic of slight resilience; said valve core being made of a relatively soft, readily deformable rubber.

6. A needle type inflation valve structure comprising a housing having a radially extending, circumferential flange adapted to be secured to an inflatable article, said housing affording a through opening into the article; a resilient valve core comprising a stem seated within said through opening, said stem being axially perforated to receive an inflation needle and having radially extending forward and rearward flanges at forward and rearward ends thereof, respectively, said flanges radially overlapping said housing adjacent to the ends of said through opening; said through opening having one end thereof substantially larger than the other end and having a frustoconical tapering wall extending inwardly of said through opening from said larger end to said other end; a substantial portion of the axial dimension of said stem being frustoconical and tapering forwardly from said rearward flange in the same direction as and engaging said tapering wall of said through opening; said stem having integrally formed, radially projecting sealing rings disposed adjacent to the ends of said frustoconical portion of said stem and compressed tightly against said wall of said through opening; said one end of said stem and said forward flange having axially forwardly facing outer end surface portions which are rounded and curve backwardly toward said rearward flange whereby when the valve core is inserted forward end first into said larger end of said through opening, said rounded surface portions coact with said converging wall portions of said through opening to fold said forward flange backwardly and facilitate the seating of said valve core in said through opening.

* * * * *